US010354270B2

(12) United States Patent
Wang et al.

(10) Patent No.: US 10,354,270 B2
(45) Date of Patent: Jul. 16, 2019

(54) INTERACTIVE METHOD, MOBILE TERMINAL AND SERVER

(71) Applicant: SHELL INTERNET (BEIJING) SECURITY TECHNOLOGY CO., LTD., Beijing (CN)

(72) Inventors: Huaiqing Wang, Beijing (CN); Xiangwei Li, Beijing (CN); Zhong Yin, Beijing (CN); Meng Zhang, Beijing (CN)

(73) Assignee: SHELL INTERNET (BEIJING) SECURITY TECHNOLOGY CO., LTD., Beijing (CN)

( * ) Notice: Subject to any disclaimer, the term of this patent is extended or adjusted under 35 U.S.C. 154(b) by 405 days.

(21) Appl. No.: 15/105,393

(22) PCT Filed: Aug. 13, 2014

(86) PCT No.: PCT/CN2014/084270
§ 371 (c)(1),
(2) Date: Jun. 16, 2016

(87) PCT Pub. No.: WO2015/090078
PCT Pub. Date: Jun. 25, 2015

(65) Prior Publication Data
US 2016/0328736 A1 Nov. 10, 2016

(30) Foreign Application Priority Data
Dec. 17, 2013 (CN) .......................... 2013 1 0695932

(51) Int. Cl.
*G06Q 30/00* (2012.01)
*G06Q 30/02* (2012.01)
(Continued)

(52) U.S. Cl.
CPC ......... *G06Q 30/0236* (2013.01); *G06Q 30/02* (2013.01); *G06Q 30/0239* (2013.01);
(Continued)

(58) Field of Classification Search
None
See application file for complete search history.

(56) References Cited

U.S. PATENT DOCUMENTS

2005/0172001 A1* 8/2005 Zaner ...................... H04L 29/06
709/205
2005/0182773 A1* 8/2005 Feinsmith .............. G06Q 10/10
(Continued)

FOREIGN PATENT DOCUMENTS

CA 2779805 A1 12/2013
CN 102143128 A 8/2011
(Continued)

OTHER PUBLICATIONS

English Translation of the International Search Report and Written Opinion corresponding to International Patent Application No. PCT/CN2014/084270, dated Nov. 18, 2014, 13 pages.
(Continued)

*Primary Examiner* — Matthew T Sittner
(74) *Attorney, Agent, or Firm* — Lathrop Gage LLP

(57) ABSTRACT

Embodiments of the present disclosure disclose an interactive method, a client device, a mobile terminal and a server, which relate to an Internet technology field and provide a new way for interacting with a user. The interactive method provided by the present disclosure includes: sending a first request of obtaining first activity information to a server, such that the server obtains the first activity information in local according to the first request of obtaining first activity information, the first activity information comprising an activity entrance icon; receiving the first activity information
(Continued)

returned by the server; displaying the activity entrance icon on a user interface of the client device according to the first activity information; receiving an activity participating instruction issued by a user through operating the activity entrance icon; popping up an activity participating result according to the activity participating instruction.

20 Claims, 9 Drawing Sheets

(51) Int. Cl.
    *G06Q 50/00* (2012.01)
    *G06F 3/0488* (2013.01)
    *G06F 3/0484* (2013.01)

(52) U.S. Cl.
    CPC .......... *G06Q 50/01* (2013.01); *G06F 3/0484* (2013.01); *G06F 3/0488* (2013.01)

(56) References Cited

U.S. PATENT DOCUMENTS

| | | | | |
|---|---|---|---|---|
| 2008/0147793 A1* | 6/2008 | Singh | ............ | G06Q 10/109 709/204 |
| 2008/0234041 A1* | 9/2008 | Berman | ............ | G07F 17/32 463/27 |
| 2010/0048358 A1* | 2/2010 | Tchao | ............ | G06F 19/3418 482/9 |
| 2011/0098928 A1* | 4/2011 | Hoffman | ............ | A63B 24/0062 702/5 |
| 2012/0054010 A1 | 3/2012 | Bouta et al. | | |
| 2012/0265676 A1* | 10/2012 | Gould | ............ | G06Q 20/102 705/39 |
| 2012/0290977 A1* | 11/2012 | Devecka | ............ | H04W 4/21 715/810 |
| 2013/0157693 A1* | 6/2013 | Mercuri | ............ | H04W 4/21 455/456.3 |
| 2013/0260893 A1* | 10/2013 | Shin | ............ | G06F 3/04815 463/42 |
| 2014/0173459 A1* | 6/2014 | Gaiser | ............ | H04L 67/22 715/753 |
| 2016/0328736 A1* | 11/2016 | Wang | ............ | G06Q 30/02 |

FOREIGN PATENT DOCUMENTS

| | | | |
|---|---|---|---|
| CN | 102143231 A | * | 8/2011 |
| CN | 102710655 A | | 10/2012 |
| CN | 103677526 A | | 3/2014 |

OTHER PUBLICATIONS

Lemon, "Fortune Seeking (Pocket Edition) Fantasy Westward Journey II Introduction to the Activity of the Single's Day (Pocket Edition)", 9 pp [retrieved from http://play.163.com/13/1107/09/9D2OM2NJ0031400S_2.html, cited in Third office action from SIPO for CN application 201310695932.8.

Chinese Patent Application No. 201310695932.8, Office Action dated Dec. 27, 2017, 23 pages.

Chinese Patent Application No. 201310695932.8, English translation of Office Action dated Mar. 1, 2016, 17 pages.

Chinese Patent Application No. 201310695932.8, Office Action dated Mar. 1, 2016, 12 pages.

* cited by examiner

INTERACTIVE METHOD, MOBILE TERMINAL AND SERVER

FIELD

The present disclosure generally relates to an Internet technology field, and more particularly to an interactive method, a client device, a mobile terminal and a server.

BACKGROUND

With the quickening pace of life and increasing demand on life quality, mobile terminals become more welcomed by users due to the powerful functions, and have been widely used. Meanwhile, a variety of applications used in the mobile terminal have been developed, which can provide various kinds of user experiences to users. Generally, the application refers to the application installed in the mobile terminal such as the mobile phone and the tablet PC. In terms of oriented objects, the applications are divided into individual user applications (oriented to individual customers) and enterprise-level applications (oriented to enterprises). In terms of operating systems of the mobile terminal, the applications mainly include iOS (mobile operating system produced by Apple Inc) applications (for example, simultaneous pushing) and Android applications (for example, AirDroid and Baidu Application). The iOS applications are applications installed based on iOS operation system, and the Android applications are applications installed based on Android operating system.

Currently, many application developers generally hold various kinds of activities, such as lucky draw, for promoting application products via social network platforms. In the related art, the application developers will set news about the activity and the entrance for participating in the activity on some social network platforms such as official website, official Weibo, and WeChat, such that the users can view the news and participate in the activity according to the activity demands.

However, the above method for promoting activities has following problems. The news about the activity is published on the social network platform, and thus the user can know about the activity only if he uses the social network platform. Moreover, when the user wishes to participate in the activity, he has to use the social network platform for participating, which is inconvenient for the user to participate in the activity and degrades the user experience.

SUMMARY

With respect to problems existing in the related art, the present disclosure provides an interactive method, a client device, a mobile terminal and a server, which provides a new way for interacting with a user, such that it is convenient for the user to participate activities, and a user experience is improved.

In order to overcome above technical problems, embodiments of a first aspect of the present disclosure provide an interactive method executed by a client device installed in a mobile terminal, and the method includes:
sending a first request of obtaining first activity information to a server, such that the server obtains the first activity information in local according to the first request of obtaining first activity information, the first activity information including an activity entrance icon;
receiving the first activity information returned by the server;
displaying the activity entrance icon on a user interface of the client device according to the first activity information;
receiving an activity participating instruction issued by a user through operating the activity entrance icon;
popping up an activity participating result according to the activity participating instruction.

Combined with the first aspect, in a first implementation of the first aspect, popping up an activity participating result according to the activity participating instruction includes:
sending an activity participating request to the server according to the activity participating instruction, such that the server obtains the activity participating result according to the activity participating request;
receiving the activity participating result returned by the server;
popping up the activity participating result returned by the server.

Combined with the first aspect, in a second implementation of the first aspect, the method further includes:
sending a second request of obtaining second activity information to the server, such that the server searches for the second activity information in local according to the second request of obtaining second activity information, the second activity information including activity configuration information, and the activity configuration information including first indication information indicating a display mode of the activity entrance icon;
receiving the second activity information returned by the server, if the server finds the second activity information,
displaying the activity entrance icon on a user interface of the client device includes:
displaying the activity entrance icon on the user interface of the client device according to the display mode indicated by the first indication information.

Combined with the second implementation of the first aspect, in a third implementation of the first aspect, the activity configuration information further includes second indication information about the activity participating result;
the method further includes:
obtaining an activity participating result corresponding to the second indication information;
popping up the activity participating result according to the activity participating instruction includes:
popping up the activity participating result corresponding to the second indication information, according to the activity participating instruction.

Combined with the third implementation of the first aspect, in a fourth implementation of the first aspect, obtaining an activity participating result corresponding to the second indication information includes:
sending a request of obtaining the activity participating result to the server according to the second indication information;
receiving the activity participating result corresponding to the second indication information, returned by the server.

Combined with the first aspect, in a fifth implementation of the first aspect, the first activity information further includes activity configuration information, and the activity configuration information includes first indication information indicating a display mode of the activity entrance icon and second indication information about the activity participating result;
displaying the activity entrance icon on the user interface of the client device includes:
displaying the activity entrance icon on the user interface of the client device according to the display mode indicated by the first indication information;

the method further includes:

obtaining an activity participating result corresponding to the second indication information;

popping up the activity participating result according to the activity participating instruction includes:

popping up the activity participating result corresponding to the second indication information, according to the activity participating instruction.

Combined with the fifth implementation of the first aspect, in a sixth implementation of the first aspect, obtaining an activity participating result corresponding to the second indication information about the activity participating result includes:

sending a request of obtaining the activity participating result to the server according to the second indication information;

receiving the activity participating result corresponding to the second indication information, returned by the server.

Combined with the first aspect or any one of the above six implementations of the first aspect, in a seventh implementation of the first aspect, the activity entrance icon has a function of prompting activity content and/or festivals and/or solar terms.

Combined with the first aspect or any one of the above seven implementations of the first aspect, in an eighth implementation of the first aspect, a social networking tool link is set on the activity participating result via the client device, such that the user shares the activity participating result via a social networking tool.

Combined with the first aspect or any one of the above eight implementations of the first aspect, in a ninth implementation of the first aspect, the activity participating result includes at least one of festival greeting information, gift giving information, winning information and solar terms reminding information.

In order to overcome above technical problems, embodiments of a second aspect of the present disclosure provide an interactive method executed by a server corresponding to a client device installed in a mobile terminal, and the method includes:

receiving a first request of obtaining first activity information sent by the client device;

obtaining the first activity information in local according to the first request of obtaining first activity information, the first activity information including an activity entrance icon;

returning the first activity information to the client device, such that the client device displays the activity entrance icon on a user interface of the client device according to the first activity information, and further pops up an activity participating result according to an activity participating instruction after receiving the activity participating instruction issued by a user through operating the activity entrance icon.

Combined with the second aspect, in a first implementation of the second aspect, after returning the first activity information to the client device, the method further includes:

receiving an activity participating request sent by the client device according to the activity participating instruction;

obtaining the activity participating result according to the activity participating request;

returning the activity participating result to the client device, such that the client device pops up the activity participating result.

Combined with the second aspect, in a second implementation of the second aspect, the method further includes:

receiving a second request of obtaining second activity information sent by the client device;

searching for the second activity information in local according to the second request of obtaining second activity information, the second activity information including activity configuration information, and the activity configuration information including first indication information indicating a display mode of the activity entrance icon;

if finding the second activity information, returning the second activity information to the client device, such that the client device displays the activity entrance icon on the user interface of the client device according to the display mode indicated by the first indication information.

Combined with the second implementation of the second aspect, in a third implementation of the second aspect, the activity configuration information further includes second indication information about the activity participating result, such that the client device obtains an activity participating result corresponding to the second indication information, and pops up the activity participating result corresponding to the second indication information.

Combined with the third implementation of the second aspect, in a fourth implementation of the second aspect, after returning the second activity information to the client device, the method further includes:

receiving a request of obtaining the activity participating result sent by the client device according to the second indication information;

returning the activity participating result corresponding to the second indication information, to the client device.

Combined with the second aspect, in a fifth implementation of the second aspect, the first activity information further includes activity configuration information, the activity configuration information includes first indication information indicating a display mode of the activity entrance icon and second indication information about the activity participating result, such that the client device displays the activity entrance icon on the user interface of the client device according to the display mode indicated by the first indication information, obtains the activity participating result corresponding to the second indication information, and pops up the activity participating result corresponding to the second indication information, according to the activity participating instruction.

Combined with the fifth implementation of the second aspect, in a sixth implementation of the second aspect, after returning the first activity information to the client device, the method further includes:

receiving a request of obtaining the activity participating result sent by the client device according to the second indication information;

returning the activity participating result corresponding to the second indication information to the client device.

Combined with the second aspect or any one of the above six implementations of the second aspect, in a seventh implementation of the second aspect, the activity entrance icon has a function of prompting activity content and/or festivals and/or solar terms.

Combined with the second aspect or any one of the above seven implementations of the second aspect, in an eight implementation of the second aspect, the activity participating result includes at least one of festival greeting information, gift giving information, winning information and solar terms reminding information.

In order to overcome above technical problems, embodiments of a third aspect of the present disclosure provide a client device, and the client device includes:

a request sending unit, configured to send a first request of obtaining first activity information to a server, such that the server obtains the first activity information in local according to the first request of obtaining first activity information, the first activity information including an activity entrance icon;

an activity information receiving unit, configured to receive the first activity information returned by the server;

an activity entrance icon displaying unit, configured to display the activity entrance icon on a user interface of the client device according to the first activity information;

an activity participating instruction receiving unit, configured to receive an activity participating instruction issued by a user through operating the activity entrance icon;

an activity participating result pop-up unit, configured to pop up an activity participating result according to the activity participating instruction.

Combined with the third aspect, in a first implementation of the third aspect, the activity participating result pop-up unit is configured to:

send an activity participating request to the server according to the activity participating instruction, such that the server obtains the activity participating result according to the activity participating request;

receive the activity participating result returned by the server;

pop up the activity participating result returned by the server.

Combined with the third aspect, in a second implementation of the third aspect, the request sending unit is further configured to send a second request of obtaining second activity information to the server, such that the server searches for the second activity information in local according to the second request of obtaining second activity information, the second activity information including activity configuration information, and the activity configuration information including first indication information indicating a display mode of the activity entrance icon;

the activity information receiving unit is further configured to receive the second activity information returned by the server, if the server finds the second activity information;

the activity entrance icon displaying unit is configured to display the activity entrance icon on the user interface of the client device according to the display mode indicated by the first indication information.

Combined with the second implementation of the third aspect, in a third implementation of the third aspect, the activity configuration information further includes second indication information about the activity participating result;

the client device further includes:

a first activity participating result obtaining unit, configured to obtain an activity participating result corresponding to the second indication information;

the activity participating result pop-up unit is configured to:

pop up the activity participating result corresponding to the second indication information, obtained by the first activity participating result obtaining unit according to the activity participating instruction.

Combined with the third implementation of the third aspect, in a fourth implementation of the third aspect, the first activity participating result obtaining unit is configured to:

send a request of obtaining the activity participating result to the server according to the second indication information;

receive the activity participating result corresponding to the second indication information, returned by the server.

Combined with the third aspect, in a fifth implementation of the third aspect, the first activity information further includes activity configuration information, and the activity configuration information includes first indication information indicating a display mode of the activity entrance icon and second indication information about the activity participating result;

the activity entrance icon displaying unit is configured to:

display the activity entrance icon on the user interface of the client device according to the display mode indicated by the first indication information;

the client device further includes:

a second activity participating result obtaining unit, configured to obtain an activity participating result corresponding to the second indication information;

the activity participating result pop-up unit is configured to:

pop up the activity participating result corresponding to the second indication information, obtained by the second activity participating result obtaining unit according to the activity participating instruction.

Combined with the fifth implementation of the third aspect, in a sixth implementation of the third aspect, the second activity participating result obtaining unit is configured to:

send a request of obtaining the activity participating result to the server according to the second indication information;

receive the activity participating result corresponding to the second indication information, returned by the server.

Combined with the third aspect or any one of the above six implementations of the third aspect, in a seventh implementation of the third aspect, the activity entrance icon has a function of prompting activity content and/or festivals and/or solar terms.

Combined with the third aspect or any one of the above seven implementations of the third aspect, in an eighth implementation of the third aspect, the activity participating result pop-up unit is configured to set a social networking tool link on the activity participating result, such that the user shares the activity participating result via a social networking tool.

Combined with the third aspect or any one of the above eight implementations of the third aspect, in a ninth implementation of the third aspect, the activity participating result includes at least one of festival greeting information, gift giving information, winning information and solar terms reminding information.

In order to overcome above technical problems, embodiments of a fourth aspect of the present disclosure provide a server, and the server includes:

a request receiving unit, configured to receive a first request of obtaining first activity information sent by a client device;

an activity information obtaining unit, configured to obtain the first activity information in local according to the first request of obtaining first activity information, the first activity information including an activity entrance icon;

an activity information returning unit, configured to return the first activity information to the client device, such that the client device displays the activity entrance icon on a user interface of the client device according to the first activity information, and further pops up an activity participating result according to an activity participating instruction after receiving the activity participating instruction issued by a user through operating the activity entrance icon.

Combined with the fourth aspect, in a first implementation of the fourth aspect, the server further includes a first activity participating result returning unit configured to:

receive an activity participating request sent by the client device according to the activity participating instruction;

obtain the activity participating result according to the activity participating request;

return the activity participating result to the client device, such that the client device pops up the activity participating result.

Combined with the fourth aspect, in a second implementation of the fourth aspect, the request receiving unit is further configured to receive a second request of obtaining second activity information sent by the client device;

the activity information obtaining unit is further configured to search for the second activity information in local according to the second request of obtaining second activity information, the second activity information including activity configuration information, and the activity configuration information including first indication information indicating a display mode of the activity entrance icon;

the activity information returning unit is further configured to return the second activity information to the client device if the second activity information is found, such that the client device displays the activity entrance icon on the user interface of the client device according to the display mode indicated by the first indication information.

Combined with the second implementation of the fourth aspect, in a third implementation of the fourth aspect, the activity configuration information further includes second indication information about the activity participating result, such that the client device obtains an activity participating result corresponding to the second indication information and pops up the activity participating result corresponding to the second indication information.

Combined with the third implementation of the fourth aspect, in a fourth implementation of the fourth aspect, the server further includes a second activity participating result returning unit configured to:

receive a request of obtaining the activity participating result sent by the client device according to the second indication information;

return the activity participating result corresponding to the second indication information to the client device.

Combined with the fourth aspect, in a fifth implementation of the fourth aspect, the first activity information further includes activity configuration information, the activity configuration information includes first indication information indicating a display mode of the activity entrance icon and second indication information about the activity participating result, such that the client device displays the activity entrance icon on the user interface of the client device according to the display mode indicated by the first indication information, obtains the activity participating result corresponding to the second indication information, and pops up the activity participating result corresponding to the second indication information according to the activity participating instruction.

Combined with the fifth implementation of the fourth aspect, in a sixth implementation of the fourth aspect, the server further includes a third activity participating result returning unit configured to:

receive a request of obtaining the activity participating result sent by the client device according to the second indication information;

return the activity participating result corresponding to the second indication information to the client device.

Combined with the fourth aspect or any one of the above six implementations of the fourth aspect, in a seventh implementation of the fourth aspect, the activity entrance icon has a function of prompting activity content and/or festivals and/or solar terms.

Combined with the fourth aspect or any one of the above seven implementations of the fourth aspect, in an eighth implementation of the fourth aspect, the activity participating result includes at least one of festival greeting information, gift giving information, winning information and solar terms reminding information.

In order to overcome above technical problems, embodiments of a fifth aspect of the present disclosure provide a mobile terminal, and the mobile terminal includes a processor, a memory, a communication interface and a bus, in which the processor, the memory and the communication interface are connected and communicate with each other via the bus;

the memory is configured to store executable program codes;

the processor is configured to read the executable program codes stored in the memory for running a program corresponding to the executable program codes, such that the processor is configured to:

send a first request of obtaining first activity information to a server, such that the server obtains the first activity information in local according to the first request of obtaining first activity information, the first activity information including an activity entrance icon;

receive the first activity information returned by the server;

display the activity entrance icon on a user interface of the client device according to the first activity information;

receive an activity participating instruction issued by a user through operating the activity entrance icon;

pop up an activity participating result according to the activity participating instruction.

In order to overcome above technical problems, embodiments of a sixth aspect of the present disclosure provide a server, and the server includes a processor, a memory, a communication interface and a bus, in which the processor, the memory and the communication interface are connected and communicate with each other via the bus;

the memory is configured to store executable program codes;

the processor is configured to read the executable program codes stored in the memory for running a program corresponding to the executable program codes, such that the processor is configured to:

receive a first request of obtaining first activity information sent by a client device;

obtain the first activity information in local according to the first request of obtaining first activity information, the first activity information including an activity entrance icon;

return the first activity information to the client device, such that the client device displays the activity entrance icon on a user interface of the client device according to the first activity information, and further pops up an activity participating result according to an activity participating instruction after receiving the activity participating instruction issued by a user through operating the activity entrance icon.

In order to overcome above technical problems, embodiments of a seventh aspect of the present disclosure provide an application program configured to execute the interactive method according to the first aspect of the present disclosure when run.

In order to overcome above technical problems, embodiments of an eighth aspect of the present disclosure provide a storage medium configured to store an application program that, when run, executes the interactive method according to the first aspect of the present disclosure.

In order to overcome above technical problems, embodiments of a ninth aspect of the present disclosure provide an application program configured to execute the interactive method according to the second aspect of the present disclosure when run.

In order to overcome above technical problems, embodiments of a tenth aspect of the present disclosure provide a storage medium configured to store an application program that, when run, executes the interactive method according to the second aspect of the present disclosure.

With the interactive method, the client device, the mobile terminal and the server provided by embodiments of the present disclosure, the client device displays the activity entrance icon returned by the server on the user interface of the client device, such that the user can participate in activities directly by operating the activity entrance icon. In this way, a new interactive way is provided for the user, in which the client device directly requests the activity from the server, and displays the activity entrance icon on its own user interface when receiving the activity entrance icon returned by the server, such that the user can participate in the activity directly via the activity entrance icon on the user interface without other network platforms, thus effectively improving the user experience.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
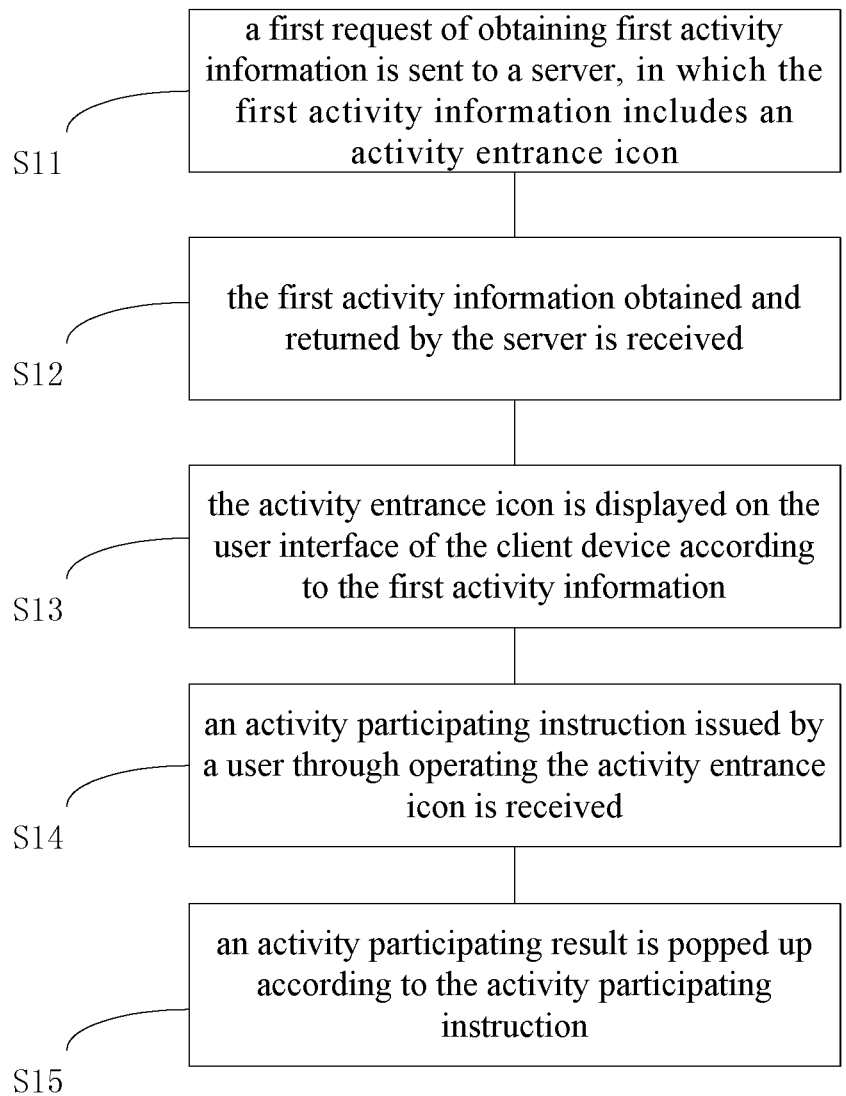
FIG. 1 is a flow chart of an interactive method according to a first embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

It is to be understood that phraseology and terminology used herein with reference to device or element orientation (such as, terms like "longitudinal", "lateral", "up", "down", "front", "rear", "left", "right", "vertical", "horizontal", "top", "bottom", "inside", "outside") are only used to simplify description of the present invention, and do not indicate or imply that the device or element referred to must have or operated in a particular orientation. They cannot be seen as limits to the present disclosure.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

The interactive method provided by embodiments of the present disclosure aims to provide a new way for interacting with a user, which is different from the conventional way that the application producer holds activities via other social network platforms to promote application products, and realizes pushing activities to the user by the client device itself. Thus, the user can participate in the activity directly on the user interface of the application without the aid of other social network platforms, which is convenient for the user and improves the user experience.

It should be noted that, in embodiments of the present disclosure, the activity refers to the product promotion activity held for attracting users to the application product. There may be many activity contents, such as lucky draw, gift giving activities, festival greeting activities, solar terms reminding activities, and so on, which is not limited herein.

As well known by those skilled in the art, the luck draw refers to an activity which provides the chance of winning to participants, i.e. an activity in which some winners are selected from users participating in the activity. Specifically, the winners may be selected according to a predetermined winning rule, and provided with prizes. The prizes may be physical objects (such as shoulder bags, makeup, living goods, etc.) or virtual goods (such as points, electronic coupons, etc.).

The gift giving activity refers to an activity which gives gifts to users participating in the activity. The gifts may also be physical objects (such as living goods) or virtual goods (such as application points), which is not limited. It is possible to give the same gifts to all the users, or it is possible to preset a gift giving rule and give different gifts to different users.

The festival greeting activity refers to an activity which provides festival greetings to users participating in the activity during festivals. For example, during festivals, a variety of funny festival greeting words or pictures are provided to the users, for conveying festival greeting information to the users.

The solar terms reminding activity refers to an activity which reminds the users participating in the activity of the solar terms. For example, it may remind the users of the current or upcoming solar term, the origin of the solar term, allusions to the solar term, some notes on clothes and foods during the solar term, etc.

It should be noted that, the above activities may be set separately or comprehensively. That is, there may be two or more activity contents in one activity, for example, the festival greeting activity is combined with the lucky draw, and the user is provided with festival greetings when participating in the lucky draw.

The interactive method provided by the present disclosure will be described in detail below with reference to specific embodiments.

Embodiment 1

It should be noted that, this embodiment relates to an interactive method, executed by a mobile terminal, and specifically executed by a client device installed in the mobile terminal. The mobile terminal includes, but is not limited to, a mobile phone, a tablet PC, a PDA (Personal Digital Assistant), etc. In this embodiment, the client device is the application installed in the mobile terminal.

FIG. 1 is a flow chart of the interactive method provided in this embodiment, the interactive method is executed by the client device installed in the mobile terminal, and the interactive method includes following steps.

In step S11, a first request of obtaining first activity information is sent to a server, such that the server obtains the first activity information in local according to the first request of obtaining first activity information, in which the first activity information includes an activity entrance icon.

It should be noted that, in this embodiment, the "activity entrance icon" is an icon configured for the user to participate in the activity, and is to be displayed on a user interface of the client device. For the user, when the user operates the activity entrance icon displayed on the user interface, for example, operates the icon by clicking the icon or moving the icon, it indicates that the user participates in the activity.

When an activity needs to be held, producers will put information relevant to the activity, such as the activity entrance icon, on the server, and the client device will obtain the activity entrance icon from the server via the first request of obtaining first activity information. After receiving the first request of obtaining first activity information, the server will find the icon in local and return the icon to the client device via the first activity information.

In this embodiment, the style of the activity entrance icon is not limited, and can be randomly configured by those skilled in the art. Certainly, for attracting users to the activity, the activity entrance icon can be designed with elements such as color and patterns, so as to attract users.

Alternatively, in order to embody characteristics of the activity obviously, the activity entrance icon may have an activity content prompt function and/or festivals and/or solar terms prompt function. That is, the shape or style of the activity entrance icon may give prompt information on activity content or on festivals/solar terms to the user. For example, the activity entrance icon is configured as a word "gift", for prompting the user that the content of the activity is gift giving; the activity entrance icon is configured as a word "prize", for prompting the user that the content of the activity is a lucky draw; the activity entrance icon is configured as a pattern of "turkey", for prompting the user that the activity is held for celebrating Thanksgiving Day; the activity entrance icon is configured as a pattern of "Christmas tree", for prompting the user that the activity is held for celebrating Christmas.

As an alternative way, in this embodiment of the present disclosure, the first request of obtaining first activity information may be sent to the server periodically, specifically, the first request of obtaining first activity information may be sent to the server according to a predetermined request period, in which the predetermined request period may be 24 hours or any other request periods, which is not limited herein.

In step S12, the first activity information obtained and returned by the server is received.

When the client device receives the first activity information, it indicates that the client device receives the activity entrance icon.

In step S13, the activity entrance icon is displayed on the user interface of the client device according to the first activity information.

It should be understood that, in this embodiment, the display mode of the activity entrance icon is not limited, and the display mode includes at least one of a display position, a display size, and a display state of the activity entrance icon, in which the display state indicates whether the activity entrance icon is displayed in a dynamic mode or in a static mode, and the dynamic mode includes blinking, color gradient, animation, floating, etc.

Specifically, the user interface on which the activity entrance icon is displayed and the specific position at which the activity entrance icon is displayed are not limited, which can be randomly configured by those skilled in the art. For example, the activity entrance icon may be located on or near a certain function button on a certain user interface, and does not affect the operation by the user on the function button. In this way, when the user needs to click the function button, he will find the activity entrance icon and further participate in the activity.

For the client device, the display mode of the activity entrance icon may be preset, or may be configured by the server in real time.

In step S14, an activity participating instruction issued by a user through operating the activity entrance icon is received.

Specifically, the user may operate the icon by clicking the activity entrance icon or moving the icon, so as to issue the activity participating instruction.

In step S15, an activity participating result is popped up according to the activity participating instruction.

When receiving the activity participating instruction issued by the user, the client device obtains the activity participating result according to the activity participating instruction, and displays the activity participating result, such that the user can view the activity participating result.

Specifically, the client device may pop up the activity participating result by means of popping up a picture, and in the picture, the activity participating result is displayed in a form of words or images. Certainly, the activity participating result may also be displayed to the user by means of popping up words.

It should be noted that, the activity participating result popped up may be different with different activity contents. Specifically, when the activity is the festival greeting activity, the activity participating result popped up may be festival greeting words and/or festival greeting pictures for conveying the festival greeting information to the user. For example, for the Christmas greeting activity held for celebrating Christmas, the activity participating result popped up may be greeting words "Merry Christmas" and/or featured pictures relevant with Christmas. When the activity is the gift giving activity, the activity participating result popped up may be names of gifts and/or pictures of gifts, in which the gifts may be physical objects (such as living goods) or virtual goods (such as application points). When the activity is the solar term reminding activity, the activity participating result popped up may embody the origin of the solar term, allusions to the solar term, customs of the solar term, notes on clothes or foods during the solar term, etc. When the activity is the lucky draw, the activity participating result popped up may be words embodying whether winning or non-winning and pictures of the prizes, for example, words of "congratulation on winning" and pictures of the winning items are popped up.

The client device may obtain the activity participating result in many ways. For example, the activity participating result is determined by the server and sent to the client device by the server.

It should be noted that, with respect to different activity contents, the server determines the activity participating result in different ways. For example, when the activity content is the lucky draw, the server may preset a certain winning rule and determine activity participating result according to the winning rule (for example, one winner is selected every a certain interval). If multiple users (i.e. multiple client devices) participate in the activity at the same time, then the server may select one winner from the multiple users, and sends the activity participating result about whether winning or non-winning to the client devices in a form of pictures according to the winning results of the client devices. When the activity content is the gift giving activity, the server may also preset a certain gift giving rule, and obtains the activity participating result according to the preset gift giving rule. For example, the server determines the gift given to the user according to a usage frequency of the application, in which, for the user who uses the application more frequently, the value of the gift given to him is higher, and for the user who uses the application less frequently, the value of the gift given to him is lower, and then the server returns the activity participating result obtained according to this giving rule to the client device. When the activity content is the festival greeting activity, the server may preset a form of the festival greeting, for example, the server may design festival greeting words and images relevant with festival greeting in the pictures and express the festival greeting in the form of pictures. When the server receives the request from the client device, the server returns the pictures designed with the festival greeting words and images relevant with festival greeting to the client device. When the activity content is the solar term reminding activity, the server may preset the form of solar term reminding, for example, the server may design the pictures with words and images about the origin, the allusions and the notes of the solar term and remind the user of the solar term in the form of pictures. When the server receives the request from the client device, the server returns the pictures designed with words and images about the origin, the allusions and the notes of the solar term to the client device.

Alternatively, the client device may obtain the activity participating result in the following way.

First, the client device sends the activity participating request to the server according to the activity participating instruction. Then, after receiving the activity participating request, the server obtains the activity participating result according to the activity participating request, and then returns the activity participating result to the client device. In this step, the client device will pop up the activity participating result returned by the server.

In this way, when the user operates the activity entrance icon, the client device sends the activity participating request to the server, such that the server returns the activity participating result obtained according to the activity participating request. Therefore, the client device obtains the activity participating result when the user issues the activity participating instruction, such that the activity participating result is ensured to be obtained after the user issues the activity participating instruction, thus ensuring the real-time performance of the activity participating result.

In this way, the server returns the activity participating result to the client device after the user operates the activity entrance icon. However, the present disclosure is not limited to this, and the server may return the activity participating result to the client device before the user operates the activity entrance icon.

For example, in another alternative embodiment, before the user operates the activity entrance icon, the server may directly carry the activity participating result in the first activity information, or in other information except the first activity information, so as to return the activity participating result to the client device. After receiving the activity participating result, the client device stores the activity participating result returned by the server in local. When the user issues the activity participating instruction, the client device obtains the activity participating result in local. In this way, it may save the time of sending the request to the server and receiving the activity participating result after the user issues the activity participating instruction, thus reducing the waiting time and improving the user experience.

Alternatively, in order to make it convenient for the user to share the news about the activity and the activity participating result, a link to at least one social networking tool may be set on the activity participating result. For example, when the activity participating result is popped up by popping up a picture, the link to the social networking tool may be set at a certain position on the picture, for example, at the bottom of the picture, such that the link to the social networking tool and the activity participating result do not affect each other. In this way, the user may share the activity participating result via the social networking tools, and more users may know about the activity. For example, the social networking tools may include one or more of twitter, facebook, google plus, wechat, weibo, and QQ.

The interactive method provided in this embodiment is executed by the client device installed in the mobile terminal. By displaying the activity entrance icon returned by the server on the user interface of the client device, the activity participating instruction issued by the user through operating the activity entrance icon is received, and then the activity participating result can be popped up according to the activity participating instruction. Thus, in one hand, the client device may directly request the activity from the server and display the activity information on its own user interface after receiving the activity information returned by the server, without the aid of other network platforms for issuing the activity information, and in the other hand, the user may participate in the activity directly via the activity entrance icon on the user interface, without the aid of other network platforms, thus improving the user experience.

Embodiment 2

Based on the interactive method provided in the above Embodiment 1, another interactive method is provided in this embodiment. Corresponding to the interactive method executed by the client device installed in the mobile terminal, the interactive method in this embodiment is executed by a server corresponding to the client device installed in the mobile terminal.

It should be understood that, the explanation for respective steps in the above embodiment is also suitable for steps in this embodiment, which is not elaborated herein.

In step S21, a first request of obtaining first activity information sent by the client device is received.

Generally, when an activity is to be held, the developers will put the first activity information on the server, and the client device will obtain the first activity information from the server according to the first request of obtaining first activity information. After receiving the first request of obtaining first activity information, the server will find the first activity information in local and returns the first activity information to the client device.

Alternatively, the client device may send the first request of obtaining first activity information to the server according to a predetermined request period, so as to obtain the first activity information from the server. The predetermined request period may be 24 hours or any other request period, which is not limited herein.

In step S22, the first activity information is obtained in the server locally according to the first request of obtaining first activity information, in which the first activity information includes an activity entrance icon.

Specifically, when the server receives the first request of obtaining first activity information sent by the client device, the server searches for the first activity information in local, for returning the first activity information to the client device. When the server returns the first activity information to the client device, it indicates that the activity entrance icon is returned to the client device.

In step S23, the first activity information is returned to the client device, such that the client device displays the activity entrance icon on the user interface of the client device according to the first activity information, and further pops up the activity participating result according to an activity participating instruction after receiving the activity participating instruction issued by the user through operating the activity entrance icon.

Specifically, after the server returns the first activity information to the client device, i.e. after the server returns the activity entrance icon to the client device, the client device displays the activity entrance icon on the user interface according to the first activity information, such that the user participates in the activity directly on the user interface of the client device (i.e. the application).

In an embodiment, when the user participates in the activity by operating the activity entrance icon on the client device, i.e. after the client device receives the activity participating instruction issued by the user through operating the activity entrance icon, the client device sends the activity participating request to the server according to the activity participating instruction. In this way, the server executes the following steps accordingly.

First, the server receives the activity participating request sent by the client device according to the activity participating instruction. Then, the server obtains the activity participating result according to the activity participating request and returns the activity participating result to the client device, such that the client device pops up the activity participating result returned by the server.

In this way, when the server receives the activity participating request sent by the client device, the server obtains the activity participating result and returns the activity participating result to the client device, such that the client device can obtain the activity participating result when the user issues the activity participating instruction, thus ensuring the real-time performance of the activity participating result.

It should be noted that, in the above description, the server returns the activity participating result of the user (client device) to the client device after receiving the activity participating request, i.e. after the user operates the activity entrance icon. However, the present disclosure is not limited to this, and before the user operates the activity entrance icon, the server may determine the activity participating result and returns the activity participating result to the client device.

For example, in another alternative embodiment, before the user operates the activity entrance icon, the server may determine the activity participating result and directly carry the activity participating result in the first activity information, or in other information except the first activity information, so as to return it to the client device. After receiving the activity participating result, the client device will store the activity participating result returned by the server in local. Then, when the user issues the activity participating instruction, the client device obtains the activity participating result in local. In this way, it saves the time of sending the request to the server and receiving the activity participating result after the user issues the activity participating instruction, thus reducing the waiting time and improving the user experience.

Regarding how the server determines (obtains) the activity participating result corresponding to the client device, it is not limited in the present disclosure. Specifically, the server may determine the activity participating result to be returned to the client device by calculating according to a preset obtaining rule. The developers may also pre-store the activity participating result in the server, and the server will determine the activity participating result to be returned to the client device according to the pre-stored activity participating result.

It should be noted that, with respect to different activity contents, the server determines the activity participating result in different ways. For example, when the activity content is the lucky draw, the server may preset a certain winning rule and determine activity participating result according to the winning rule (for example, one winner is selected every a certain interval). If multiple users (i.e. multiple client devices) participate in the activity at the same time, then the server may select one winner from the multiple users, and sends the activity participating result about whether winning or non-winning to the client devices in a form of pictures according to the winning results of the client devices. When the activity content is the gift giving activity, the server may also preset a certain gift giving rule, and obtains the activity participating result according to the preset gift giving rule. For example, the server determines the gift given to the user according to a usage frequency of the application, in which, for the user who uses the application more frequently, the value of the gift given to him is higher, and for the user who uses the application less frequently, the value of the gift given to him is lower, and then the server returns the activity participating result obtained according to this giving rule to the client device. When the activity content is the festival greeting activity, the server may preset a form of the festival greeting, for example, the server may design festival greeting words and images relevant with festival greeting in the pictures and express the festival greeting in the form of pictures. When the server receives the request from the client device, the server returns the pictures designed with the festival greeting words and images relevant with festival greeting to the client device. When the activity content is the solar term reminding activity, the server may preset the form of solar term reminding, for example, the server may design the pictures with words and images about the origin, the allusions and the notes of the solar term and remind the user of the solar term in the form of pictures. When the server receives the request from the client device, the server returns the pictures designed with words and images about the origin, the allusions and the notes of the solar term to the client device.

The interactive method provided in this embodiment is executed by the server corresponding to the client device installed in the mobile terminal. The server returns the first activity information to the client device according to the first request of obtaining first activity information sent by the client device, such that the activity entrance icon included in the first activity information is displayed on the user interface, and the user can participate in the activity by operating the activity entrance icon. Thus, in one hand, the server may directly release the activity information to the client device according to the request from the client device, such that the client device may display the activity information on the user interface of the client device, without the aid of other network platforms for issuing the activity information, and in the other hand, the user may participate in the activity directly via the activity entrance icon on the user interface, which is convenient for the user and improves the user experience.

In order to make those skilled in the art understand the technical solutions of the present disclosure better, specific embodiments are described below for further explaining the technical solutions of the present disclosure.

Embodiment 3

Based on the interactive methods in the above two embodiments, another interactive method is provided in this embodiment. Unless specified otherwise, the explanation of respective steps in the above two embodiments is also suitable for steps in this embodiment, which is not elaborated herein.

Figure 3:
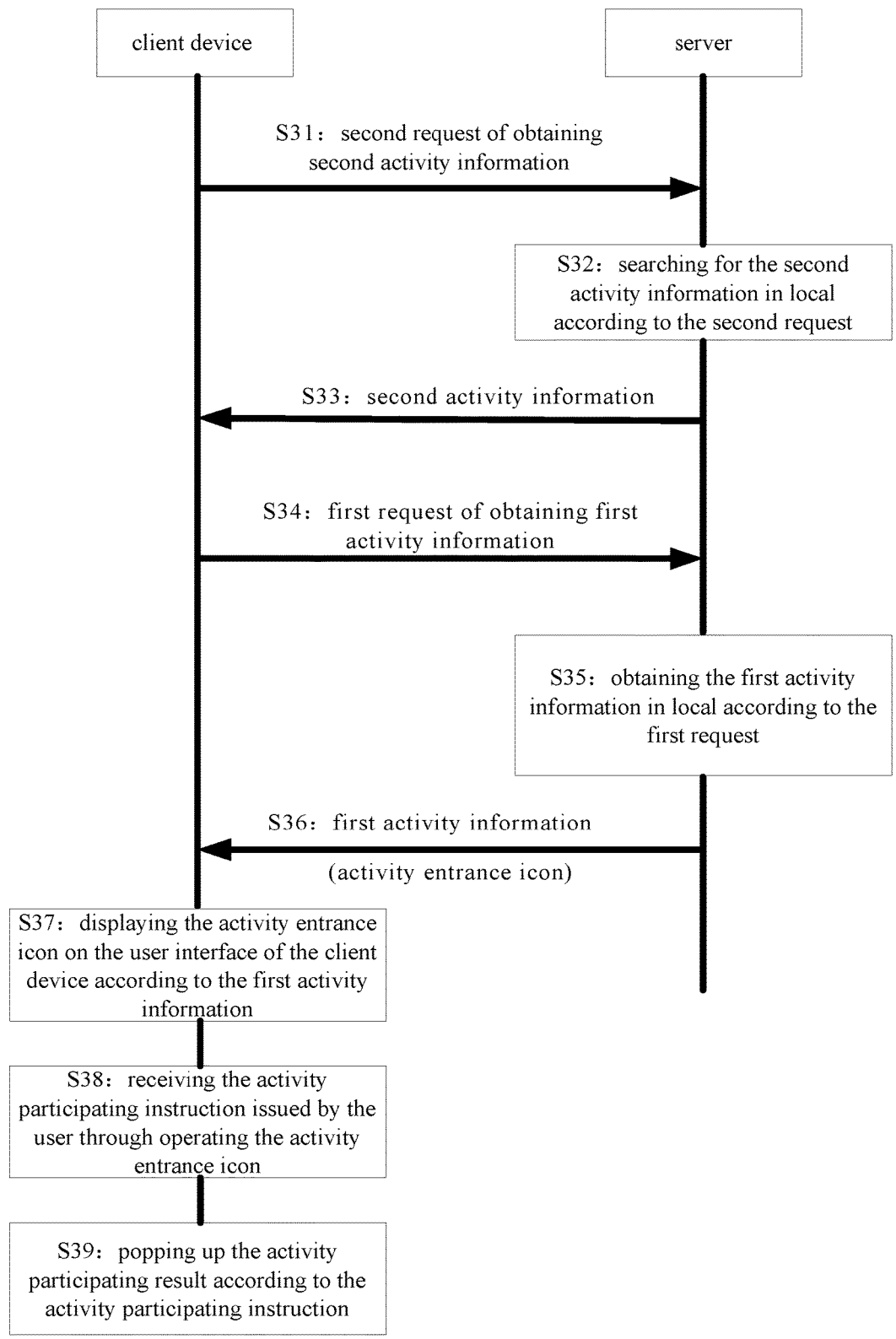
FIG. 3 is a flow chart of an interactive method according to a third embodiment of the present disclosure.

As shown in FIG. 3, the interactive method in this embodiment include following steps.

In step S31, a client device sends a second request of obtaining second activity information to a server.

In step S32, the server searches for the second activity information in local according to the second request of obtaining second activity information after receiving the second request of obtaining second activity information sent by the client device.

In step S33, if the server finds the second activity information, the server returns the second activity information to the client device, in which the second activity information includes activity configuration information, and the activity configuration information includes first indication information indicating a display mode of an activity entrance icon.

It should be noted that, in this embodiment, "the second request of obtaining second activity information" is different from the first request configured for obtaining the "activity entrance icon". In this embodiment, before sending the first request to the server, the client device sends the second request to the server for obtaining the activity configuration information from the server.

When an activity is to be held, developers will pre-store the second activity information relevant with the activity in the server, in which the second activity information includes the activity configuration information, and the activity configuration information includes the first indication information indicating a display mode of the activity entrance icon. After receiving the second request of obtaining second activity information, the server searches for the second activity information in local and returns the second activity information to the client device if finding it.

It should be understood that, if the server finds the second activity information, it indicates that the server finds the activity configuration information, i.e. the server finds the first indication information indicating the display mode of the activity entrance icon. Accordingly, if the client device receives the second activity information, it indicates that the client device receives the activity configuration information, i.e. the client device receives the first indication information indicating the display mode of the activity entrance icon.

Alternatively, if the server does not find the second activity information, the server may return an indication to the client device for informing the client device that there is no second activity information.

It should be understood that, according to the information returned by the server according to the second request, the client device may know whether there is an activity at this time. If the server returns the second activity information, it indicates that there is an activity at this time, i.e. the second activity information is stored in the server at this time.

Specifically, the second activity information includes the activity configuration information, and the activity configuration information includes the first indication information indicating the display mode of the activity entrance icon.

The first indication information is configured to inform the client device of the display mode of the activity entrance icon, i.e., the display mode of the activity entrance icon is configured for the client device. Specifically, the display mode includes at least one of a display position, a display size, and a display state of the activity entrance icon, in which the display state indicates whether the activity entrance icon is displayed in a dynamic mode or in a static mode, and the dynamic mode includes blinking, color gradient, animation, floating, etc. For example, the display position of the activity entrance icon is configured in the first indication information indicating the display mode of the activity entrance icon, i.e. the first indication information indicating the display mode of the activity entrance icon indicates the user interface on which the activity entrance icon is displayed and the specific position at which the activity entrance icon is displayed.

It should be noted that, alternatively, the "activity configuration information" may further include other configuration information required by the client device for activity promotion, except the first indication information for configuring the display mode of the activity entrance icon. For example, the activity configuration information may further include the indication information for configuring the memory address of the activity entrance icon in the mobile terminal and the indication information for configuring the start/end time of the activity, which is not limited herein.

Alternatively, in embodiments of the present disclosure, the client device may send the second request to the server periodically. Specifically, the client device may send the second request to the server according to the preset request period, for example, the preset request period may be 24 hours or any other request period, which is not limited herein.

In step S34, the client device sends the first request of obtaining first activity information to the server.

In step S35, after receiving the first request sent by the client device, the server obtains the first activity information in local according to the first request, in which the first activity information includes the activity entrance icon.

In step S36, the server returns the first activity information to the client device.

In this embodiment, if the client device receives the second activity information fed by the server, it knows the activity to be promoted, and at this time, the client device sends the first request to the server according to the second activity information, for obtaining the activity entrance icon.

Certainly, it should be understood by those in the art that, in embodiments of the present disclosure, the client device may not send the second request to the server in prior to sending the first request to the server, and alternatively, the client device may send the first request to the server first and then send the second request to the server, which is not limited herein. That is, steps S31-S33 and steps S34-S36 may be executed in different orders. In other words, in another embodiment, steps S34-S36 may be executed first and then steps S31-S33 are executed. That is, after the client device receives the first activity information (the activity entrance icon), the client device knows that an activity is to be promoted, and then the client device sends the second request to the server according to the first activity information for obtaining the second activity information (i.e. the activity configuration information) from the server.

In this embodiment, it should be noted that, the activity entrance icon (the first activity information) and the activity configuration information (the second activity information) are requested by the client device separately and are sent to the client device by the server separately. Since the activity entrance icon is generally configured as a picture which has a big size, it wastes a lot of traffic and time for the client device to receive the activity entrance icon. Thus, in this embodiment, the activity entrance icon and the activity configuration information are transmitted separately, so as to avoid the problems that the server has a large pressure and it wastes a lot of time to send and receive information.

In step S37, the client device displays the activity entrance icon on the user interface of the client device according to the first activity information.

In this embodiment, the activity configuration information in the second activity information includes the first indication information indicating the display mode of the activity entrance icon, such that the client device can display the activity entrance icon on the user interface of the client device according to the display mode indicated by the first indication information.

It should be noted that, in this embodiment, the first indication information may include the position indication information indicating the display position of the activity entrance icon on the user interface, the size indication information indicating the size of the activity entrance icon, the state indication information indicating the display state of the activity entrance icon, etc. the display state indicates whether the activity entrance icon is displayed in a dynamic mode or in a static mode, and the dynamic mode includes blinking, color gradient, animation, floating, etc. For example, the position indication information specifies that the activity entrance icon is disposed on or near a certain function button on a certain user interface, without affecting the operation on the function button; the size indication information specifies that the size of the activity entrance icon is configured to be less than or equal to the size of the function button; the state indication information specifies that the activity entrance icon is displayed on the user interface in a manner of blinking. It should be understood by those skilled in the art that, the information included in the first indication information is not limited to these.

In step S38, the client device receives the activity participating instruction issued by the user through operating the activity entrance icon.

In step S39, the client device pops up the activity participating result according to the activity participating instruction.

The client device may obtain the activity participating result in many ways. In this embodiment, the activity participating result is determined by the server and sent to the client device by the server.

For example, when the server receives the second request or the first request, it will trigger the server to determine the activity participating result, and to return the activity participating result to the client device before the client device pops up the activity participating result. In this case, the server may put the activity participating result in the first activity information for returning it to the client device, or the server may put the activity participating result in the second activity information for returning it to the client device.

Certainly, in an alternative embodiment, the server may return the activity participating result to the client device via other information except the first activity information and the second activity information.

For example, in an embodiment, the server may put the second indication information about the activity participating result in the activity configuration information of the second activity information, and the second indication information may be the activity participating result, such that the client device may directly obtain the activity participating result according to the second indication information. When there are a plurality of possible participating results, the second indication information may indicate the result of this participating, such that the client device may obtain the result of this participating from the server according to the second indication information and further pop up the activity participating result. For example, with respect to the lucky draw, there are two participating results, i.e. winning and non-winning, and in this case, the second indication information may indicate which participating result is the result of this participating, for example, "0" represents for winning and "1" represents for non-winning, and the client device may obtain the activity participating result to be popped up from the server according to the second indication information, for example, winning picture or non-winning picture, and pop up it for displaying it to the user.

Furthermore, for example, the client device may send the activity participating request to the server after receiving the activity participating instruction issued by the user, and triggered by the request, the server determines the activity participating result and returns the activity participating result to the client device, such that the client device pops up the result for displaying it to the user.

With the interactive method in this embodiment, the client device obtains the activity information via two requests, the activity configuration information is requested first, and then the activity entrance icon is requested.

It should be understood that, the client device may send more than two requests to the server. In another embodiment, except the above two requests, the client device also sends the request of obtaining the activity participating result to the server, and after receiving this request, the server returns the activity participating result to the client device.

Embodiment 4

Based on the above embodiments, another interactive method is provided in this embodiment.

Figure 4:
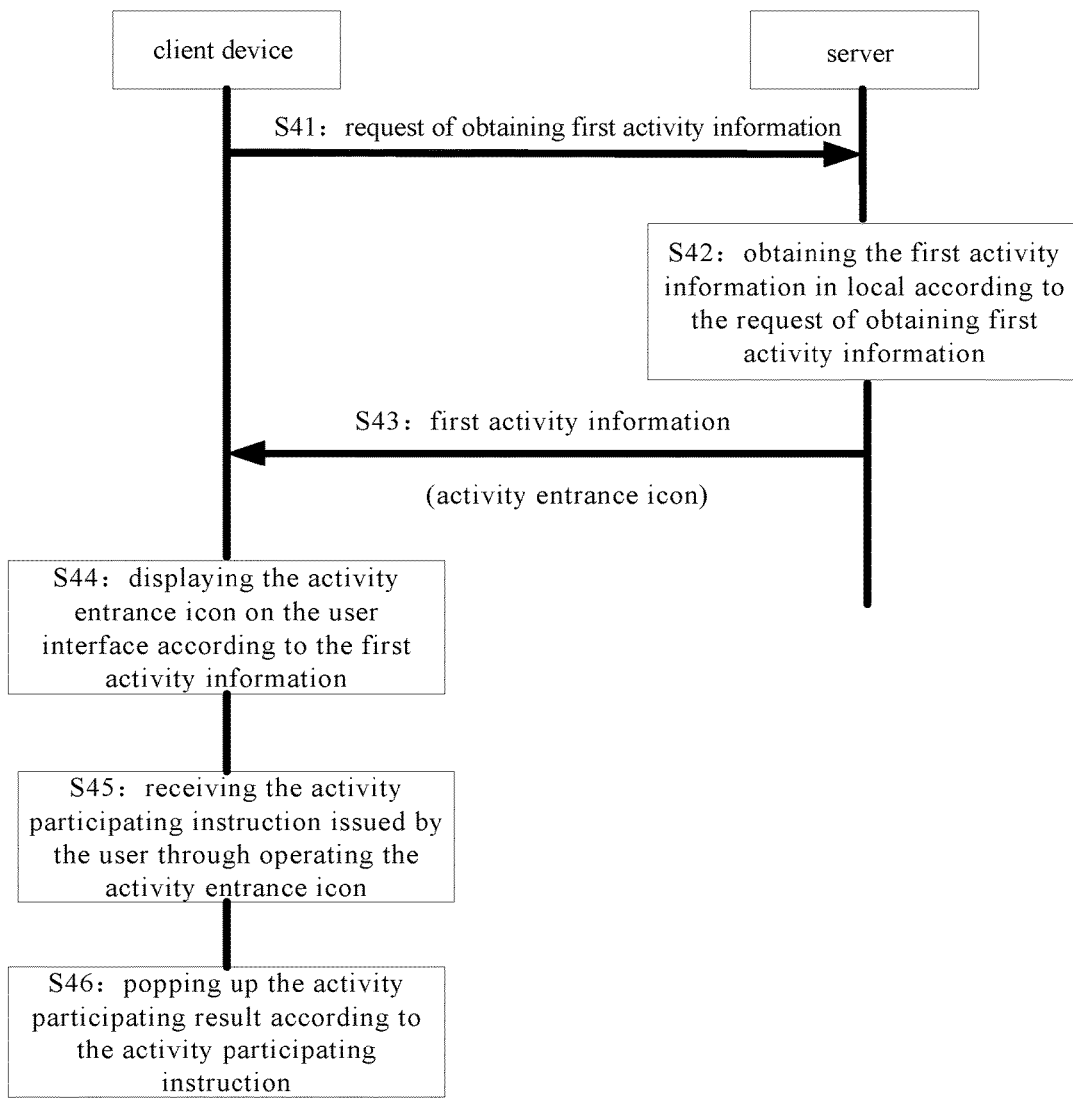
FIG. 4 is a flow chart of an interactive method according to a fourth embodiment of the present disclosure.

In Embodiment 3, the activity entrance icon (first activity information) and the activity configuration information (second activity information) are requested by the client device separately and sent to the client device by the server separately. In contrast to Embodiment 3, in this embodiment, the activity entrance icon and activity configuration information are requested by the client device once and sent to the client device by the server simultaneously. Unless specified otherwise, explanation for respective steps in above embodiments is suitable for steps in this embodiment, which is not elaborated herein. As shown in FIG. 4, the interactive method provided in this embodiment includes following steps.

In step 41, the client device sends a request of obtaining first activity information to the server.

Alternatively, the client device may send the request of obtaining first activity information to the server according to a predetermined request period.

In step 42, the server obtains the first activity information in local according to the request of obtaining first activity information after receiving the request of obtaining first activity information sent by the client device.

Specifically, in this embodiment, the first activity information includes the activity entrance icon and the activity configuration information, and the activity configuration information includes the first indication information indicating the display mode of the activity entrance icon and the second indication information about the activity participating result. That is, after receiving the request of obtaining first activity information, the server returns the activity entrance icon and the activity configuration information to the client device simultaneously via the first activity information.

When an activity is to be held, developers will put information relevant with the activity, such as the activity entrance icon and the activity configuration information, on the server. In this embodiment, the client device will obtain the information from the server according to the request of obtaining first activity information. After receiving the request of obtaining first activity information, the server will find the information in local and return the information to the client device.

In step 43, the server returns the first activity information to the client device.

In step 44, after receiving the first activity information returned by the server, the client device displays the activity entrance icon on the user interface of the client device according to the first activity information.

In this embodiment, the configuration information includes the first indication information indicating the display mode of the activity entrance icon, and when the client device displays the activity entrance icon on the user interface, the client device displays the activity entrance icon on the user interface of the client device according to the display mode indicated by the first indication information.

In step 45, the client device receives the activity participating instruction issued by the user through operating the activity entrance icon.

In step 46, the client device pops up the activity participating result according to the activity participating instruction.

The client device may obtain the activity participating result in many ways. In this embodiment, the activity participating result is determined by the server and sent to the client device by the server.

For example, when the server receives the request of obtaining first activity information, the server is triggered to determine the activity participating result, and the result is returned to the client device before the client device pops up the activity participating result.

In this case, the server may put the activity participating result in the first activity information for returning it to the client device.

Certainly, in an alternative embodiment, the server may return the activity participating result to the client device via other information except the first activity information.

For example, in an embodiment, the server may put the second indication information about the activity participating result in the activity configuration information, in which the second indication information may directly be the activity participating result to be popped up, such that the client device may directly obtain and pop up the activity participating result according to the second indication information about the activity participating result. The second indication information about the activity participating result may indicate the result of the current participating in the event that there are a plurality of possible participating results, such that the client device may obtain the result of this participating from the server according to the second indication information about the activity participating result, and further pop up the activity participating result. For example, with respect to the lucky draw, there are two participating results, i.e. winning and non-winning, and in this case, the second indication information may indicate which participating result is the result of this participating, for example, "0" represents for winning and "1" represents for non-winning, and the client device may obtain the activity participating result to be popped up from the server according to the second indication information, for example, winning picture or non-winning picture, and pop up it for displaying it to the user.

Furthermore, for example, the client device may send the activity participating request to the server after receiving the activity participating instruction issued by the user, and under the trigger of the request, the server determines the activity participating result and returns the activity participating result to the client device, and the client device pops up the result for displaying it to the user.

Embodiment 5

In order to make those skilled in the art understand the present disclosure better, detailed explanation will be made by taking the lucky draw held for celebrating Thanksgiving Day as an example. It should be noted that, this embodiment is only used to explain the present disclosure, but not used to limit the scope of the present disclosure.

For example, this embodiment is executed by a client device corresponding to an application having a function of finding and cleaning junk files. The client device obtains the activity entrance icon, the activity configuration information and the activity participating result from the application server corresponding to the client device. With respect to how the client device obtains the information from the server, please refer to above embodiments, which will not be elaborated here.

Figure 5:
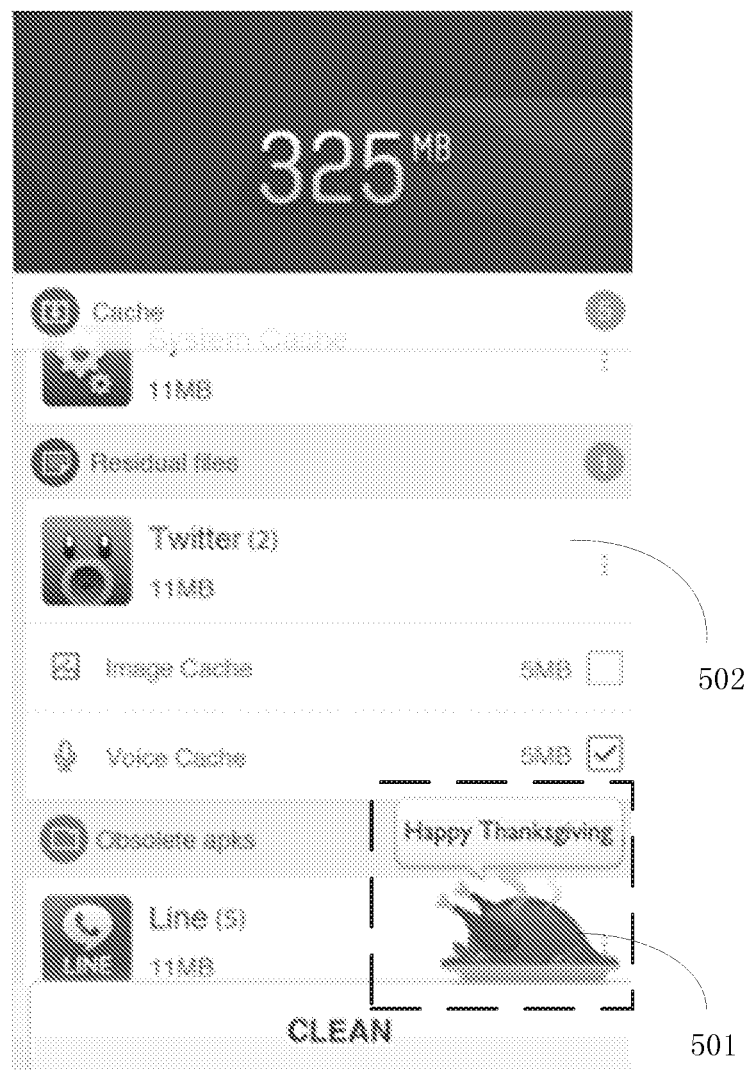
FIG. 5 is a schematic diagram of displaying an activity entrance icon on a user interface according to an embodiment of the present disclosure.

As shown FIG. 5, in this embodiment, the activity entrance icon 501 (icon in the dashed box shown in FIG. 5) includes a pattern of "turkey" and words "Happy Thanksgiving" around the pattern of "turkey", and the icon has a festival prompt function, which can prompt the user that the activity is held for celebrating Thanksgiving Day.

The client device displays the activity entrance icon near the functional button "CLEAN" on the user interface 502 according to the first indication information indicating the display mode of the activity entrance icon, in which the first indication information is included in the activity configuration information. In this way, when the user operates the button "CLEAN", he may easily see the activity entrance icon 501, and then he may click the icon for participating in the activity. Certainly, the present disclosure is not limited to this, the activity entrance icon 501 may be displayed on other user interfaces, or may be displayed at other positions, which can be defined by the first indication information indicating the display mode of the activity entrance icon. For example, the activity entrance icon may be always displayed at a fixed position on a same user interface (for example, the main interface), that is, every time the user enters the same user interface, the activity entrance icon is displayed at the same position of the user interface.

It is also possible to set the times of displaying the acidity entrance icon on the user interface every day via the activity configuration information. When the user has opened the user interface several times greater than the preset times of displaying the activity entrance icon, the activity entrance icon is no longer displayed on the user interface. For example, when the activity entrance icon is set to be displayed on the main interface, and the activity entrance icon is set to be displayed on the main interface three times every day, then the activity entrance icon is no longer displayed on the main interface if the user has entered the main interface three times a day.

Alternatively, when displaying the activity entrance icon, some animation effects, such as fluttering snowflakes and stars, may be additionally displayed on the user interface displaying the activity entrance icon, which may show visual aesthetics to the user and improve the user experience.

When the user clicks the activity entrance icon 501 for issuing the activity participating instruction, the client device receives the activity participating instruction issued by the user and pops up the activity participating result.

In this embodiment, the activity participating result is displayed in a form of pictures, and the activity participating result is determined by the server and transmitted to the client device from the server.

For the sake of explanation, with respect to the lucky draw in this embodiment, the activity participating result includes winning and non-winning. When the activity participating result is winning, the client device obtains the picture corresponding to winning from the server and pops up the picture for displaying it to the user. Similarly, when the activity participating result is non-winning, the client device obtains the picture corresponding to non-winning from the server and pops up the picture for displaying it to the user.

Figure 6:
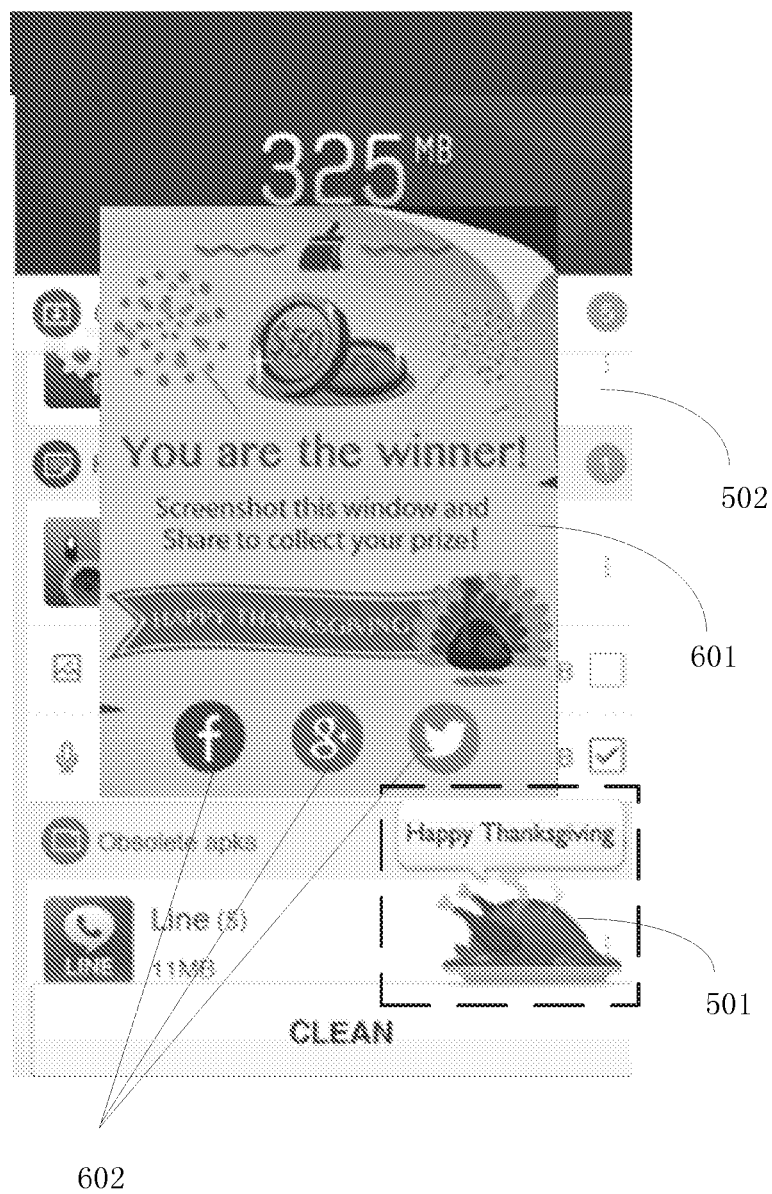
FIG. 6 is a schematic diagram of popping up a winning result after clicking the activity entrance icon in FIG. 5 by a user.

For example, FIG. 6 is a schematic diagram of popping up a winning result 601 after clicking the activity entrance icon 501 in FIG. 5 by the user. As shown in FIG. 6, in the picture corresponding to the winning result, words "You are the winner" and the coin pattern are used to inform the user that he has won. Certainly, in order to further embody festival atmosphere, as shown in FIG. 6, the winning result 601 may further include festival greeting words and images embodying festival characteristics, so as to express festival greeting to the user when informing him the winning.

Figure 7:
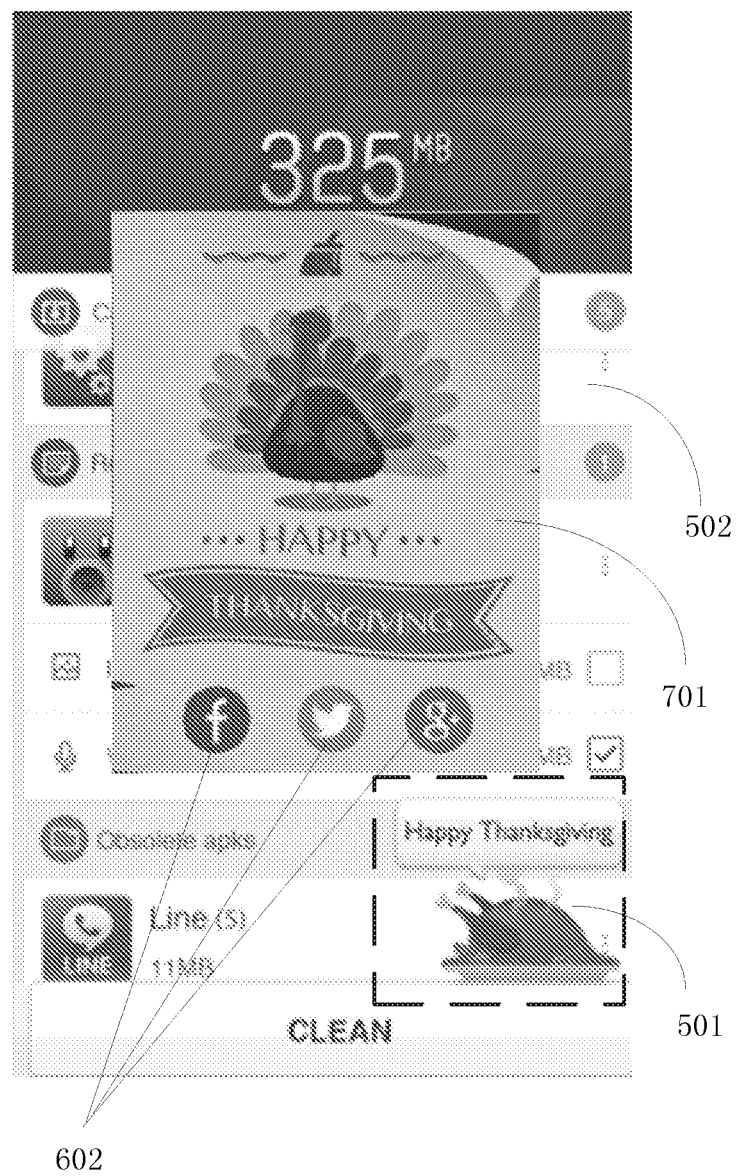
FIG. 7 is a schematic diagram of popping up a non-winning result after clicking the activity entrance icon in FIG. 5 by a user.

For example, FIG. 7 is a schematic diagram of popping up a non-winning result 701 after clicking the activity entrance icon 501 in FIG. 5 by the user. As shown in FIG. 7, in the picture corresponding to the non-winning result, words "Happy Thanksgiving" is used to inform the user that he has not won. Certainly, words such as "Thank you for your participation" and the like may be displayed to inform the user that he has not won. Similarly, in order to further embody festival atmosphere, as shown in FIG. 7, the non-winning result 701 may further include images embodying festival characteristics, such that the user may get the festival greeting after participating in the activity.

Furthermore, in order to facilitate sharing the activity, as shown in FIGS. 6 and 7, at least one link to social networking tool 602 may be set on the picture embodying the activity participating result, such that the user can share the activity participating result via the social networking tool, and thus more users may participate in the activity, and an effect of promoting the application can be realized. For example, the social networking tool may be one or more of twitter, facebook, googol plus, Wechat, Weibo and QQ.

It should be noted that, as shown in FIGS. 5-7, English words are only one exemplary display language, and are not used to limit the scope of display language. It should be understood by those skilled in the art that, words in the user interface, the activity entrance icon and activity participating result may be set to be Chinese words.

Embodiment 6

Corresponding to the interactive method executed by the client device, another embodiment of the present disclosure further provides a client device. The client device provided by the present disclosure is corresponding to the interactive method provided in above method embodiments, and provides a new interactive way for users by executing the processing procedure in above embodiments. Thus, the implementation of the interactive method executed by the client device is also suitable for the client device provided in this embodiment, and will not be elaborated herein.

Figure 8:
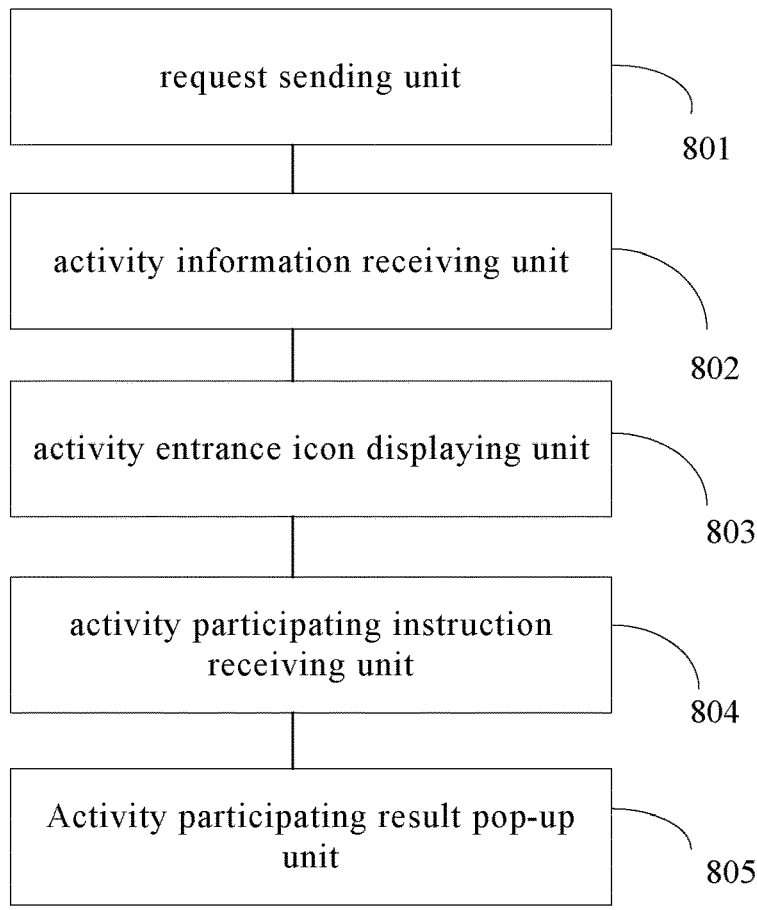
FIG. 8 is a block diagram of a client device according to a sixth embodiment of the present disclosure.

As shown in FIG. 8, a client device is provided in another embodiment of the present disclosure, and the client device includes following functional units.

The request sending unit 801 is configured to send a first request of obtaining first activity information to a server, such that the server obtains the first activity information in local according to the first request of obtaining first activity information, in which the first activity information includes an activity entrance icon.

The activity information receiving unit 802 is configured to receive the first activity information returned by the server.

The activity entrance icon displaying unit 803 is configured to display the activity entrance icon on a user interface of the client device according to the first activity information.

The activity participating instruction receiving unit 804 is configured to receive an activity participating instruction issued by a user through operating the activity entrance icon.

The activity participating result pop-up unit 805 is configured to pop up an activity participating result according to the activity participating instruction.

In this way, with the client device provided in embodiments of the present disclosure, the request sending unit requests the activity information to the server, and the activity entrance icon displaying unit displays the activity entrance icon on the user interface after the activity information receiving unit receives the activity information returned by the server, such that the user can participate in the activity by operating the activity entrance icon, and the client device can provide the activity participating result to the user according to the operation of the user. Thus, in one hand, the client device directly requests the activity to the server, and displays the activity information on the user interface thereof after receiving the activity information returned by the server, such that the client device can publish the activity information for application promotion without the aid of other network platforms and the user can view the activity without entering other network platforms, and in the other hand, when using the application, the user may directly participate in the activity held for promoting the application itself by operating the activity entrance icon on the user interface, without the aid of other network platforms, thus improving the user experience.

Alternatively, the activity participating result pop-up unit is specifically configured to:

send an activity participating request to the server according to the activity participating instruction, such that the server obtains the activity participating result according to the activity participating request;

receive the activity participating result returned by the server;

pop up the activity participating result returned by the server.

Alternatively, the request sending unit is further configured to send a second request of obtaining second activity information to the server, such that the server searches for the second activity information in local according to the second request of obtaining second activity information, in which the second activity information includes activity configuration information, and the activity configuration information includes first indication information indicating a display mode of the activity entrance icon.

The activity information receiving unit is further configured to receive the second activity information returned by the server, if the server finds the second activity information.

The activity entrance icon displaying unit is specifically configured to display the activity entrance icon on the user interface of the client device according to the display mode indicated by the first indication information.

Alternatively, the activity configuration information further includes second indication information about the activity participating result, and the client device further includes a first activity participating result obtaining unit configured to obtain an activity participating result corresponding to the second indication information. The activity participating result pop-up unit is specifically configured to pop up the activity participating result corresponding to the second indication information, obtained by the first activity participating result obtaining unit according to the activity participating instruction.

Alternatively, the first activity participating result obtaining unit is specifically configured to:

send a request of obtaining the activity participating result to the server according to the second indication information;

receive the activity participating result corresponding to the second indication information returned by the server.

Alternatively, the first activity information further includes activity configuration information, and the activity configuration information includes first indication information indicating a display mode of the activity entrance icon and second indication information about the activity participating result;

the activity entrance icon displaying unit is configured to:

display the activity entrance icon on the user interface of the client device according to the display mode indicated by the first indication information;

the client device further includes:

a second activity participating result obtaining unit, configured to obtain an activity participating result corresponding to the second indication information;

the activity participating result pop-up unit is specifically configured to:

pop up the activity participating result corresponding to the second indication information, obtained by the second activity participating result obtaining unit according to the activity participating instruction.

Alternatively, the second activity participating result obtaining unit is configured to:

send a request of obtaining the activity participating result to the server according to the second indication information;

receive the activity participating result corresponding to the second indication information returned by the server.

Alternatively, the activity entrance icon has a function of prompting activity content and/or festivals and/or solar terms.

Alternatively, the activity participating result pop-up unit is configured to set a social networking tool link on the activity participating result, such that a user shares the activity participating result via a social networking tool.

Alternatively, the activity participating result includes at least one of festival greeting information, gift giving information, winning information and solar terms reminding information.

Embodiment 7

Corresponding to the interactive method executed by the server corresponding to the client device, another embodiment of the present disclosure provides a server, which provides a new interactive way for users by executing the above processing procedure at the server side. Thus, the implementation of the interactive method executed by the server corresponding to the client device is also suitable for the server provided in this embodiment, and will not be elaborated herein.

Figure 9:
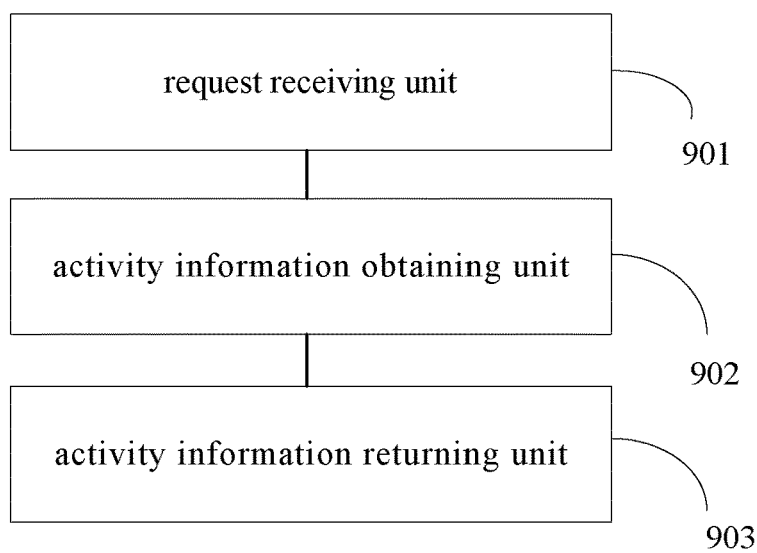
FIG. 9 is a block diagram of a server according to a seventh embodiment of the present disclosure.

As shown in FIG. 9, the server provided in this embodiment includes following functional units.

The request receiving unit 901 is configured to receive a first request of obtaining first activity information sent by the client device.

The activity information obtaining unit 902 is configured to obtain the first activity information in local according to the first request of obtaining first activity information, in which the first activity information includes an activity entrance icon.

The activity information returning unit 903 is configured to return the first activity information to the client device, such that the client device displays the activity entrance icon on a user interface of the client device according to the first activity information, and further pops up an activity participating result according to an activity participating instruction after receiving the activity participating instruction issued by a user through operating the activity entrance icon.

In this way, with the server provided by embodiments of the present disclosure, the request receiving unit receives the request from the client device, and the activity information returning unit returns the activity information including the activity entrance icon to the client device, such that the client device displays the activity entrance icon on the user interface, the user participates in the activity by operating the activity entrance icon, and the client device provides the activity participating result to the user according to the operation of the user. Thus, in one hand, the server provides the activity information to the client device according to the request of the client device, and the client device displays the activity information on the client device interface of the application itself when receiving the activity information returned by the server, such that the client device can publish the activity information for application promotion without the aid of other network platforms and the user can view the activity without entering other network platforms, and in the other hand, when using the application, the user may directly participate in the activity held for promoting the application itself by operating the activity entrance icon on the user interface, without the aid of other network platforms, thus improving the user experience.

Alternatively, the server further includes a first activity participating result returning unit configured to:

receive an activity participating request sent by the client device according to the activity participating instruction;

obtain the activity participating result according to the activity participating request;

return the activity participating result to the client device, such that the client device pops up the activity participating result.

Alternatively, the request receiving unit is further configured to receive a second request of obtaining second activity information sent by the client device;

the activity information obtaining unit is further configured to search for the second activity information in local according to the second request of obtaining second activity information, the second activity information including activity configuration information, and the activity configuration information including first indication information indicating a display mode of the activity entrance icon;

the activity information returning unit is further configured to return the second activity information to the client device if the second activity information is found, such that the client device displays the activity entrance icon on the user interface of the client device according to the display mode indicated by the first indication information.

Alternatively, the activity configuration information further includes second indication information about the activity participating result, such that the client device obtains an activity participating result corresponding to the second indication information and pops up the activity participating result corresponding to the second indication information.

Alternatively, the server further includes a second activity participating result returning unit configured to:

receive a request of obtaining the activity participating result sent by the client device according to the second indication information;

return the activity participating result corresponding to the second indication information to the client device.

Alternatively, the first activity information further includes activity configuration information, the activity configuration information includes first indication information indicating a display mode of the activity entrance icon and second indication information about the activity participating result, such that the client device displays the activity entrance icon on the user interface of the client device according to the display mode indicated by the first indication information, obtains the activity participating result corresponding to the second indication information, and pops up the activity participating result corresponding to the second indication information according to the activity participating instruction.

Alternatively, the server further includes a third activity participating result returning unit configured to:

receive a request of obtaining the activity participating result sent by the client device according to the second indication information;

return the activity participating result corresponding to the second indication information to the client device.

Alternatively, the activity entrance icon has a function of prompting activity content and/or festivals and/or solar terms.

Alternatively, the activity participating result includes at least one of festival greeting information, gift giving information, winning information and solar terms reminding information.

Figure 10:
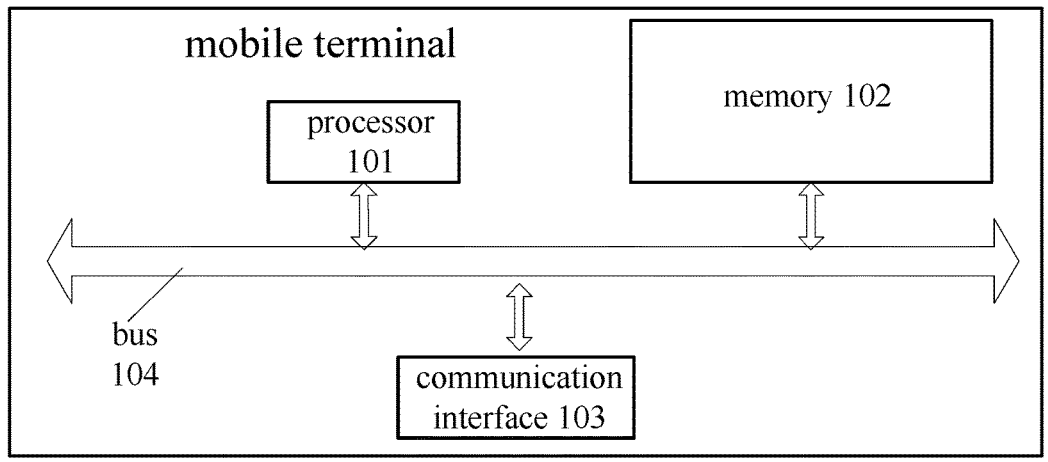
FIG. 10 is a block diagram of a mobile terminal according to an embodiment of the present disclosure.

Based on above embodiments, embodiments of the present disclosure further provide a mobile terminal. As shown in FIG. 10, the mobile terminal provided by this embodiment includes a processor 101, a memory 102, a communication interface 103 and a bus 104.

The processor 101, the memory 102 and the communication interface 103 are connected with each other via the bus 104, and the processor 101, the memory 102 and the communication interface 103 communicate with each other via the bus 104.

The memory 102 is configured to store executable program codes.

The processor 101 is configured to read the executable program codes stored in the memory for running a program corresponding to the executable program codes, such that the processor is configured to:

send a first request of obtaining first activity information to a server, such that the server obtains the first activity information in local according to the first request of obtaining first activity information, the first activity information including an activity entrance icon;

receive the first activity information returned by the server;

display the activity entrance icon on a user interface of the client device according to the first activity information;

receive an activity participating instruction issued by a user through operating the activity entrance icon;

pop up an activity participating result according to the activity participating instruction.

It should be noted that, in this embodiment, the processor 101 in the mobile terminal executes the same processing procedure as the interactive method executed by the above client device, and the implementation of the interactive method executed by the client device is also suitable for the processor in this embodiment, which will not be elaborated herein.

The mobile terminal provided by this embodiment requests the activity information to the server, and displays the activity entrance icon on the user interface after receiving the activity information returned by the server, such that the user can participate in the activity by operating the activity entrance icon, and the mobile terminal can provide the activity participating result to the user according to the operation of the user. Thus, when using the application installed in the mobile terminal, the user may directly participate in the activity held for promoting the application itself by operating the activity entrance icon on the user interface, without the aid of other network platforms, thus improving the user experience.

Figure 11:
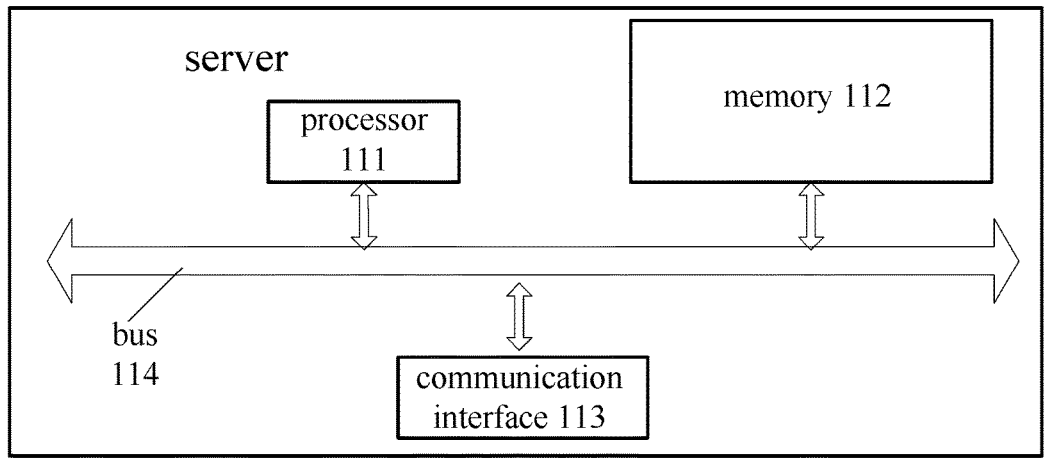
FIG. 11 is a block diagram of a server according to another embodiment of the present disclosure.

Based on above embodiments, embodiments of the present disclosure also provide a server, which is corresponding to the mobile terminal provided in the above embodiment. As shown in FIG. 11, the server provided by this embodiment includes a processor 111, a memory 112, a communication interface 113 and a bus 114.

The processor 111, the memory 112 and the communication interface 113 are connected with each other via the bus 114, and the processor 111, the memory 112 and the communication interface 113 implement communication with each other via the bus 114.

The memory 112 is configured to store executable program codes;

The processor 111 is configured to read the executable program codes stored in the memory 112 for running a program corresponding to the executable program codes, such that the processor 111 is configured to:

receive a first request of obtaining first activity information sent by the client device;

obtain the first activity information in local according to the first request of obtaining first activity information, the first activity information including an activity entrance icon;

return the first activity information to the client device, such that the client device displays the activity entrance icon on a user interface of the client device according to the first activity information, and further pops up an activity participating result according to an activity participating instruction after receiving the activity participating instruction issued by a user through operating the activity entrance icon.

It should be noted that, in this embodiment, the processor 111 in the server corresponding to the mobile terminal executes the same processing procedure as the interactive method executed by server corresponding to the above client device, and the implementation of the interactive method executed by the server corresponding to the above client device is also suitable for the processor in this embodiment, which will not be elaborated herein.

The server provided by this embodiment receives the request of obtaining the activity information from the mobile terminal, and returns the activity information including the activity entrance icon to the mobile terminal, such that the activity entrance icon can be displayed on the user interface, the user can participate in the activity by operating the activity entrance icon, and the activity participating result can be provided to the user according to the operation of the user. Thus, in one hand, the server provides the activity information to the mobile terminal according to the request of the mobile terminal, and the application installed in the mobile terminal displays the activity information on the user interface of the application itself after receiving the activity information returned by the server, such that the activity information of application promotion may be published without the aid of other network platforms, and the user can view the activity without entering the other network platforms, and in the other hand, when using the application, the user may directly participate in the activity held for promoting the application itself by operating the activity entrance icon on the user interface, without the aid of other network platforms, thus improving the user experience.

In order to achieve above embodiments, the present disclosure also provides an application program. The application program is configured to execute the interactive method in the embodiment as shown in FIG. 1 when run.

In order to achieve above embodiments, the present disclosure also provides a storage medium, configured to store an application program that, when run, executes the interactive method in the embodiment as shown in FIG. 1.

In order to achieve above embodiments, the present disclosure also provides an application program. The application program is configured to execute the interactive method in the embodiment as shown in FIG. 2 when run.

Figure 2:
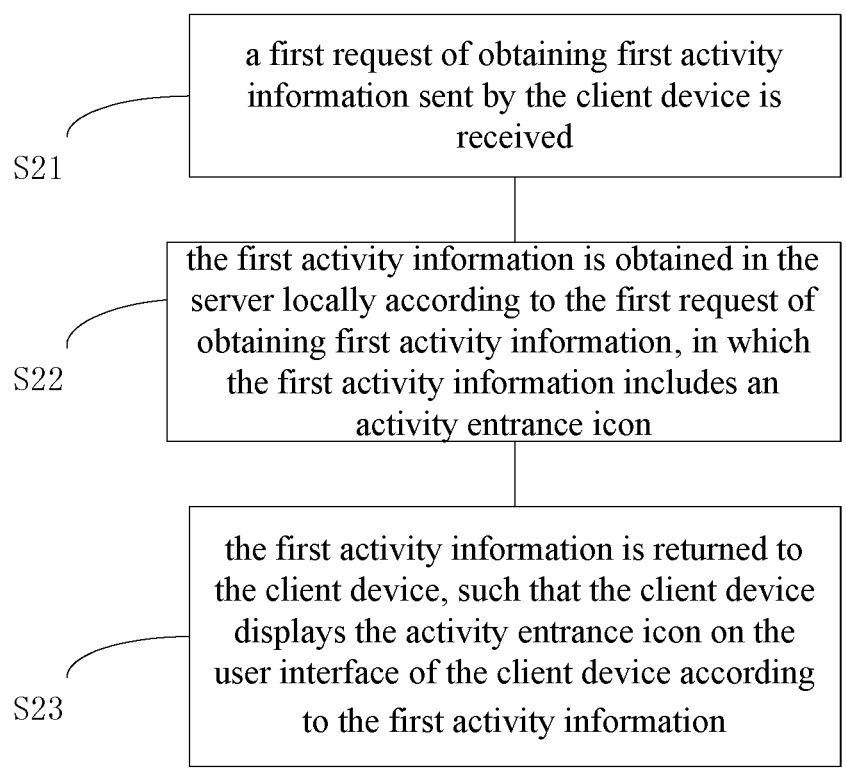
FIG. 2 is a flow chart of an interactive method according to a second embodiment of the present disclosure.

In order to achieve above embodiments, the present disclosure also provides a storage medium, configured to store an application program that, when run, executes the interactive method in the embodiment as shown in FIG. 2.

With the application programs and storage mediums according to embodiments of the present disclosure, the client device displays the activity entrance icon returned by the server on the user interface of the client device, such that the user may directly participate in the activity. Thus, a new interactive way is provided for the user, in which the client device of the application requests the activity directly to the server, and displays the activity entrance icon on the user interface of the client device of the application itself after receiving the activity entrance icon returned by the server, such that when using the application, the user may directly participate in the activity by operating the activity entrance icon on the user interface without entering the other network platforms, thus improving the user experience.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An interactive method, executed by a client device installed in a mobile terminal, and comprising:

sending a first request of obtaining first activity information to a server, such that the server obtains the first activity information in local according to the first request of obtaining first activity information, the first activity information comprising an activity entrance icon, wherein the activity entrance icon is an icon configured for a user to participate in an activity, and the activity refers to a product promotion activity held for attracting the user to an application product;

receiving the first activity information returned by the server;

displaying the activity entrance icon on a user interface of the client device according to the first activity information;

receiving an activity participating instruction issued by the user through operating the activity entrance icon; and popping up an activity participating result according to the activity participating instruction;

wherein the first activity information further comprises activity configuration information, and the activity configuration information comprises first indication information indicating a display mode of the activity entrance icon and second indication information about the activity participating result;

wherein displaying the activity entrance icon on the user interface of the client device comprises:

displaying the activity entrance icon on the user interface of the client device according to the display mode indicated by the first indication information.

2. The method according to claim 1, further comprising:

sending a second request of obtaining second activity information to the server, such that the server searches for the second activity information in local according to the second request of obtaining second activity information, the second activity information comprising activity configuration information, and the activity configuration information comprising first indication information indicating a display mode of the activity entrance icon; and receiving the second activity information returned by the server, when the server finds the second activity information;

wherein, displaying the activity entrance icon on a user interface of the client device comprises:

displaying the activity entrance icon on the user interface of the client device according to the display mode indicated by the first indication information.

3. The method according to claim 2, wherein the activity configuration information further comprises second indication information about the activity participating result;

the method further comprises:
   obtaining an activity participating result corresponding to the second indication information;
   popping up the activity participating result according to the activity participating instruction comprises:
   popping up the activity participating result corresponding to the second indication information, according to the activity participating instruction.

4. The method according to claim 3, wherein obtaining an activity participating result corresponding to the second indication information comprises:

sending a request of obtaining the activity participating result to the server according to the second indication information; and receiving the activity participating result corresponding to the second indication information returned by the server.

5. The method according to claim 1, the method further comprising:
   obtaining an activity participating result corresponding to the second indication information;
   popping up the activity participating result according to the activity participating instruction comprises:
   popping up the activity participating result corresponding to the second indication information, according to the activity participating instruction.

6. The method according to claim 5, wherein obtaining the activity participating result corresponding to the second indication information comprises:

sending a request of obtaining the activity participating result to the server according to the second indication information; and receiving the activity participating result corresponding to the second indication information returned by the server.

7. The method according to claim 1, wherein a social networking tool link is set on the activity participating result via the client device, such that the user shares the activity participating result via a social networking tool.

8. The method according to claim 2, wherein a social networking tool link is set on the activity participating result via the client device, such that the user shares the activity participating result via a social networking tool.

9. A mobile terminal, comprising a processor, a memory, a communication interface and a bus, wherein the processor, the memory and the communication interface are connected and communicated with each other via the bus;

the memory is configured to store executable program codes;

the processor is configured to read the executable program codes stored in the memory for running a program corresponding to the executable program codes, such that the processor is configured to:

send a first request of obtaining first activity information to a server, such that the server obtains the first activity information in local according to the first request of obtaining first activity information, the first activity information comprising an activity entrance icon, wherein the activity entrance icon is an icon configured for a user to participate in an activity, and the activity refers to a product promotion activity held for attracting the user to an application product;

receive the first activity information returned by the server;

display the activity entrance icon on a user interface of the client device according to the first activity information;

receive an activity participating instruction issued by the user through operating the activity entrance icon; and pop up an activity participating result according to the activity participating instruction;

wherein the first activity information further comprises activity configuration information, and the activity configuration information comprises first indication information indicating a display mode of the activity entrance icon and second indication information about the activity participating result;

wherein the processor is configured to display the activity entrance icon on a user interface of the client device according to the first activity information by a step of:

displaying the activity entrance icon on the user interface of the client device according to the display mode indicated by the first indication information.

10. The mobile terminal according to claim 9, wherein the processor is further configured to:
send a second request of obtaining second activity information to the server, such that the server searches for the second activity information in local according to the second request of obtaining second activity information, the second activity information comprising activity configuration information, and the activity configuration information comprising first indication information indicating a display mode of the activity entrance icon; and receive the second activity information returned by the server, if the server finds the second activity information;

wherein the processor is configured to display the activity entrance icon on a user interface of the client device according to the first activity information by a step of: displaying the activity entrance icon on the user interface of the client device according to the display mode indicated by the first indication information.

11. The mobile terminal according to claim 10, wherein the activity configuration information further comprises second indication information about the activity participating result;

the processor is further configured to:
obtain an activity participating result corresponding to the second indication information;
the processor is configured to pop up the activity participating result according to the activity participating instruction by a step of:
popping up the activity participating result corresponding to the second indication information, according to the activity participating instruction.

12. The mobile terminal according to claim 11, wherein the processor is further configured to obtain an activity participating result corresponding to the second indication information by steps of:
sending a request of obtaining the activity participating result to the server according to the second indication information; and
receiving the activity participating result corresponding to the second indication information returned by the server.

13. The mobile terminal according to claim 9,
wherein the processor is further configured to:
obtain an activity participating result corresponding to the second indication information;
the processor is configured to pop up the activity participating result according to the activity participating instruction by a step of:
popping up the activity participating result corresponding to the second indication information, according to the activity participating instruction.

14. The mobile terminal according to claim 13, wherein the processor is configured to obtain the activity participating result corresponding to the second indication information by steps of:
sending a request of obtaining the activity participating result to the server according to the second indication information; and
receiving the activity participating result corresponding to the second indication information returned by the server.

15. The mobile terminal according to claim 9, wherein a social networking tool link is set on the activity participating result via the client device, such that the user shares the activity participating result via a social networking tool.

16. The mobile terminal according to claim 10, wherein a social networking tool link is set on the activity participating result via the client device, such that the user shares the activity participating result via a social networking tool.

17. A server, comprising a processor, a memory, a communication interface and a bus, wherein
the processor, the memory and the communication interface are connected and communicated with each other via the bus;
the memory is configured to store executable program codes;
the processor is configured to read the executable program codes stored in the memory for running a program corresponding to the executable program codes, such that the processor is configured to:
receive a first request of obtaining first activity information sent by a client device;
obtain the first activity information in local according to the first request of obtaining first activity information, the first activity information comprising an activity entrance icon, wherein the activity entrance icon is an icon configured for a user to participate in an activity, and the activity refers to a product promotion activity held for attracting the user to an application product; and
return the first activity information to the client device, such that the client device displays the activity entrance icon on a user interface of the client device according to the first activity information, and further pops up an activity participating result according to an activity participating instruction after receiving the activity participating instruction issued by the user through operating the activity entrance icon;
wherein the first activity information further comprises activity configuration information, the activity configuration information comprises first indication information indicating a display mode of the activity entrance icon and second indication information about the activity participating result, such that the client device displays the activity entrance icon on the user interface of the client device according to the display mode indicated by the first indication information.

18. The server according to claim 17, wherein, the processor is further configured to:
receive a second request of obtaining second activity information sent by the client device; and
search for the second activity information in local according to the second request of obtaining second activity information, the second activity information comprising activity configuration information, and the activity configuration information comprising first indication information indicating a display mode of the activity entrance icon;
when the second activity information is found, return the second activity information to the client device, such that the client device displays the activity entrance icon on the user interface of the client device according to the display mode indicated by the first indication information.

19. The server according to claim 18, wherein the activity configuration information further comprises second indication information about the activity participating result, such that the client device obtains an activity participating result corresponding to the second indication information and pops up the activity participating result corresponding to the second indication information;

the processor is further configured to:
receive a request of obtaining the activity participating result sent by the client device according to the second indication information; and
return the activity participating result corresponding to the second indication information to the client device.

20. The server according to claim 17, wherein the processor is further configured to:
  receive a request of obtaining the activity participating result sent by the client device according to the second indication information; and
  return the activity participating result corresponding to the second indication information to the client device.

* * * * *